United States Patent
Uhlig

(10) Patent No.: US 6,273,220 B1
(45) Date of Patent: Aug. 14, 2001

(54) DISC BRAKE WITH ANGLED PISTON BORE

(75) Inventor: Robert P. Uhlig, Rochester Hills, MI (US)

(73) Assignee: Chrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/098,930

(22) Filed: Jun. 17, 1998

(51) Int. Cl.$^7$ .................................................. B60T 11/00
(52) U.S. Cl. ...................................... 188/72.4; 188/24.19
(58) Field of Search ........................... 188/73.35, 73.36, 188/73.37, 250 E, 72.4, 72.5, 72.6, 72.7, 24.19, 24.14, 24.12, 344

(56) References Cited

U.S. PATENT DOCUMENTS

| | | |
|---|---|---|
| 3,937,305 | 2/1976 | Vanden Bossche . |
| 4,705,145 | 11/1987 | Goulart . |
| 5,064,027 | * 11/1991 | Akamatsu .......................... 188/24.19 |
| 5,431,257 | * 7/1995 | Rocca et al. ....................... 188/24.19 |
| 5,456,339 | * 10/1995 | Zeng ................................. 188/250 E |
| 5,501,301 | * 3/1996 | Nishimura ........................... 188/72.4 |
| 5,964,321 | * 10/1999 | Hinkens ............................... 188/72.4 |

FOREIGN PATENT DOCUMENTS

0145977 * 6/1985 (EP) ................................. 188/73.35

OTHER PUBLICATIONS

Hand–written Memo dated Oct. 23, 1996 from Nisshinbo Automotive to Chrysler Corporation (1 page).

* cited by examiner

Primary Examiner—Matthew C. Graham
(74) Attorney, Agent, or Firm—Mark P. Calcaterra

(57) ABSTRACT

In order to minimize instability and significantly reduce braking noise, especially at low speeds, a disc brake's hydraulic piston and piston bore (or other brake actuating element), is angled away from the normal direction perpendicular to the pad backing plate and to the rotor. The brake-applying forces are directed in an inward angled direction, generally toward the rotor and toward the leading edge of the brake pads. Such an arrangement results in reactive forces exceeding or at least equaling the magnitude of force couples caused by the thickness of the brake pads thus causing the pads to exert a greater compressive force on the rotor at the trailing edge of the brake pads than at the leading edge of the brake pads when the vehicle is traveling in a to forward direction. This significantly increases stability when the brakes are applied and minimizes braking noise, especially at low vehicle speeds when such brake noise is typically most significant.

20 Claims, 3 Drawing Sheets

DISC BRAKE WITH ANGLED PISTON BORE

BACKGROUND AND SUMMARY OF THE INVENTION

The invention relates generally to disc brakes, such as the type commonly used on automotive vehicles. More specifically, the invention relates to such disc brakes configured to reduce the amount of brake noise encountered during low-speed brake applications.

Conventional hydraulically-actuated disc brakes include a hydraulic piston slidably movable within a piston bore formed in the disc brake caliper. Hydraulic pressure generated upon application of the brakes by an operator urges the piston inwardly toward the brake rotor (which rotates about an axis), which in turn (due to the reactive force of the caliper) causes the brake pads on opposite sides of the brake rotor to exert compressive braking forces on the rotor, slowing or ultimately halting its rotation. During this operation, the backing plates on the brake pads cause braking torque loads to be reacted against one or more rails or pins that are oriented in an axial direction normal or perpendicular to the brake pad backing plates and thus the brake rotor.

Due to the thickness of the pad backing plates and the brake pads themselves, braking forces generated at the pad-to-disc interface are offset (in an axial direction) from the outboard surface of the backing plate, thus producing force couples that cause the leading edges of the pads to compress against the rotor to a greater extent than the trailing edges of the brake pads. This tends to cause an unstable "biting in", "chattering" or "scuffing" effect on the rotor, resulting in increased brake noise, usually in the form of high frequency squeal, especially when the brakes are applied at low speeds.

With a view toward substantially minimizing this instability and significantly reducing low-speed braking noise, the present invention provides a hydraulic piston and piston bore (or other brake actuating element), that is angled away from the normal direction perpendicular to the pad backing plate and to the rotor. Thus the brake-applying forces are directed in an inward angled direction, generally toward the rotor and toward the leading edge of the brake pads. Preferably, this angulation between the centerline of the piston bore (or the force centerline of other types of actuators) and the above-mentioned normal direction is defined by rotating the piston bore centerline circumferentially about an axis defined by a line lying at the piston-to-backing plate interface, parallel to the plane of the rotor disc-to-pad rub track and passing through the rotor's axis of rotation, although other angle apex locations (closer to or farther from the rotor) may also be used. Such an arrangement results in reactive forces (due to the above-mentioned angled brake-applying forces) on the brake pads that cause them to exert a greater (or at least equal) compressive force on the rotor at the trailing edge of the brake pads when compared to the leading edge of the brake pads (when the vehicle is traveling in a forward direction). The magnitude of this effect depends in part on the amount of caliper free play in the axial and/or circumferential directions. This reversal of the leading and trailing magnitude relationship of the compressive forces (as compared with conventional brake designs) significantly increases the stability of the brake components when the brakes are applied and results in significantly minimized braking noise, especially at low vehicle speeds when such brake noise is typically most significant. Additionally, if found to be advantageous (for example, to reduce pad taper wear) in a particular brake configuration or pad geometry, the piston bore centerline (or other actuator centerline) can be angled in a radial direction (toward or away from the rotor's axis) in lieu of, or even in addition to, the above-mentioned circumferentially angled direction.

Additional objects, advantages, and features of the present invention will become apparent from the following description and the appended claims, taken in conjunction with the accompanying drawings.

DETAILED DESCRIPTION OF THE PREFERRED EMBODIMENTS

Figure 1:
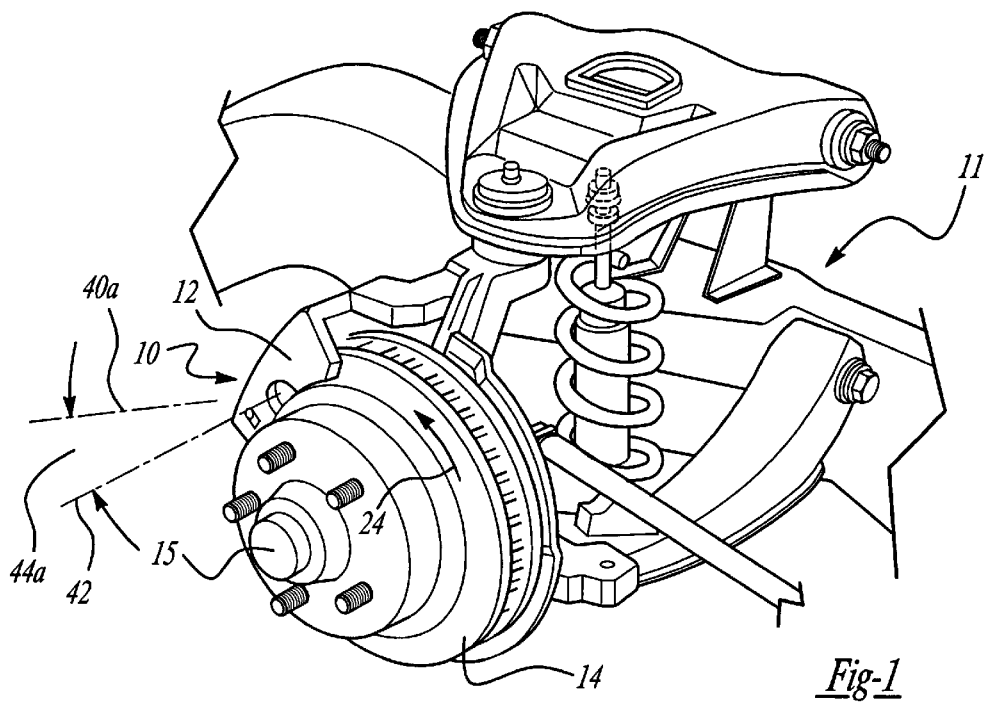
FIG. 1 is an overall perspective view of a disc brake assembly for the left-front wheel of a vehicle, according to the present invention.
Figure 2:
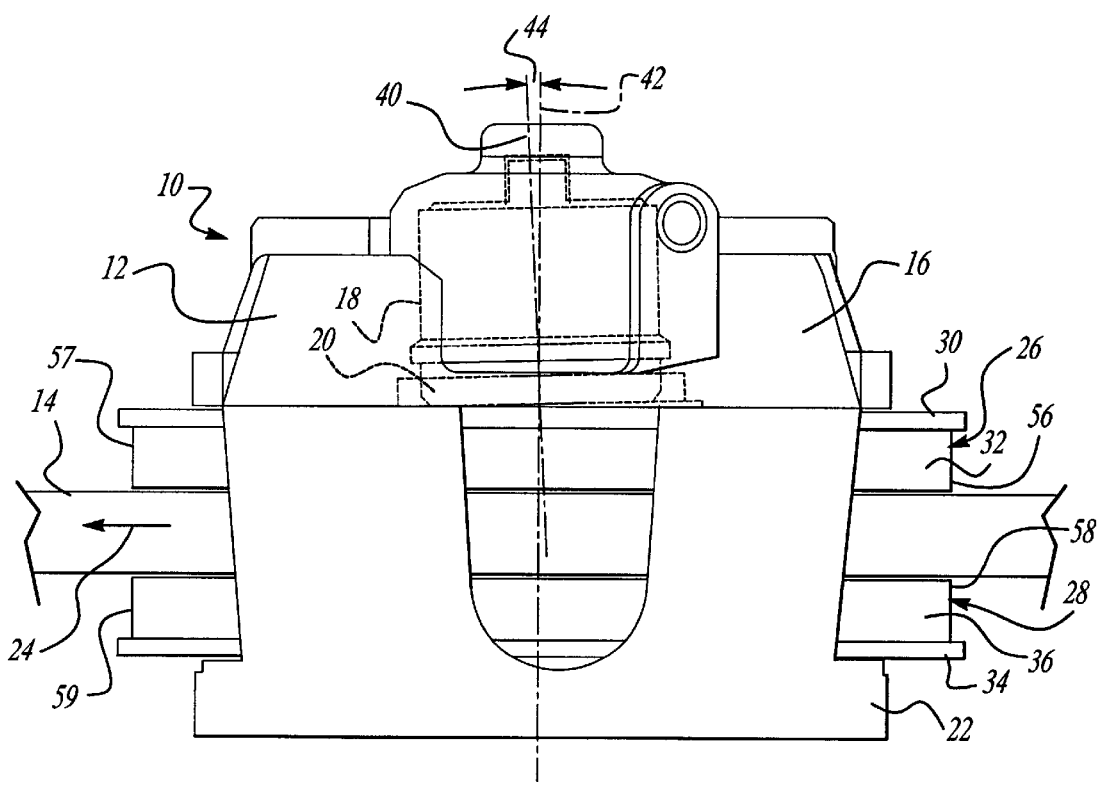
FIG. 2 is a view taken generally from the top or radially outboard side of the disc brake assembly, illustrating the angled relationship of the piston bore relative to a line perpendicular to the brake rotor.
Figure 4:
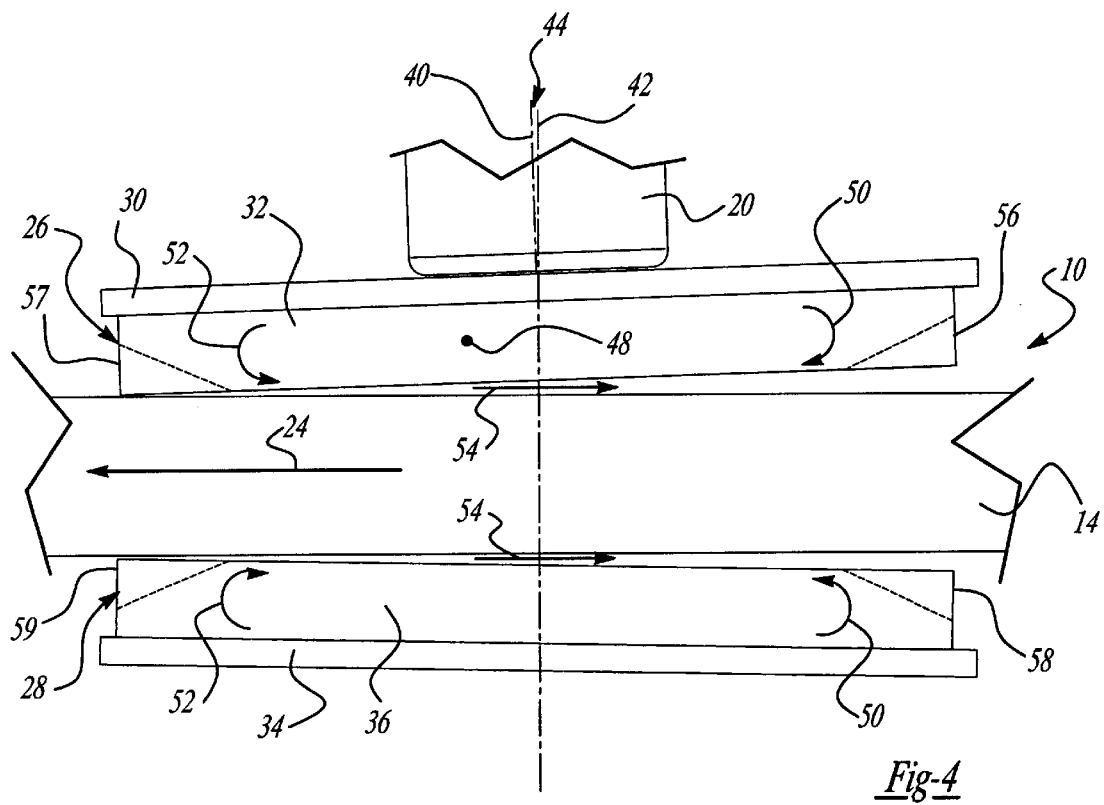
FIG. 4 is a view similar to FIG. 3, but schematically illustrating the disc brake piston bore arrangement according to the present invention.

In FIGS. 1, 2, and 4, a disc brake assembly 10, according to the present invention, is illustrated as installed on a vehicle undercarriage 11 for the left-front wheel (not shown) of the vehicle. It should be noted that although the illustrative disc brake assembly 10 illustrated in the drawings is a conventional hydraulically-actuated automotive disc brake, one skilled in the art will readily recognize from the following discussion that the principles of the present invention are equally applicable to other types of disc brake assemblies with other types of brake actuating mechanisms.

The disc brake assembly 10 includes a caliper 12, straddling a rotor or disc 14, which is rotatable about a rotor axis 15, in a direction of rotation indicated by arrow 24 when the vehicle is traveling in a forward direction. The caliper 12 includes a piston bore 18 formed therein on its inboard portion or leg 16, within which a hydraulic piston 20 is slidably and selectively actuable. The piston 20 abuttingly engages an inboard pad assembly 26, and an outboard portion or leg 22 of the caliper 12 abuttingly engages an outboard pad assembly 28. The inboard and outboard pad assemblies 26 and 28 include respective inboard and outboard backing plates 30 and 34 to which respective inboard and outboard pads 32 and 36 are fixedly secured. The pad assemblies 26 and 28 may also include insulators on their backing plates 30 and 34, on opposite sides from the pads 32 and 36. It should be noted that the pads 32 and 36 can have plane leading and trailing edges, as shown in solid lines in FIG. 4, or either simple or compound tapered leading and/or trailing edges, as shown in phantom lines in FIG. 4.

In the preferred embodiment of the present invention, the piston bore centerline 40 is oriented at an angle 44 (as shown in FIG. 2) with respect to a line 42 that is normal or perpendicular to the rotor 14. The angle 44 is preferably formed by rotating the piston bore centerline 40 about an axis described by a line lying at the piston-to-backing plate interface, parallel to the inboard plane of the disc rub track of the rotor 14 and passing through the rotor's axis. One skilled in the art will readily recognize that this angle apex can be located either closer to or farther from the rotor, depending upon the desired location of the effective center of pressure, caliper tooling considerations, pad geometry, or other such factors. As a result, the piston brake actuating force points along the piston bore centerline 40 in a direction toward the rotor 14 and toward the leading edges 56 and 58 of the inboard and outboard pads 32 and 36, respectively. Although this rotation or angulation of the piston bore centerline 40 with respect to the normal or perpendicular line 42 is preferably in a circumferential direction with respect to the rotation of the rotor 14, one skilled in the art will readily recognize that for particular brake configurations or pad geometries it may be desirable for the piston bore centerline 40 instead to be rotated in a radial direction with respect to the rotor axis 15, or even in a compound direction, angled both radially and circumferentially, as illustrated by the phantom lines in FIG. 1 for the piston bore centerline 40a, the normal or perpendicular line 42, and the angle 44a.

Although an angle 44 of approximately 2.5 degrees has been found to be advantageous in terms of pad-to-disc stability and significantly reduced chatter noise or brake squeal in low-speed brake applications when the vehicle is traveling in a forward direction, a range of 0.5 degrees to 5 degrees is believed to be the range in which an optimization of these effects are most significantly obtained in most if not all, brake designs. As one skilled in the disc brake art will readily recognize, however, the existence or non-existence of pad tapers on the leading edges of the brake pads may have an effect on the optimum angle 44, with the angle 44 likely to be advantageously increased from the above-mentioned 2.5 degrees if there is no such pad taper on the leading edges. Also, the symmetry of the pads relative to the radial centerline of the caliper or the free-play of the caliper could have an effect on the optimum angle 44, as could the composition of the brake pad material or the coefficient of friction between the brake pads and the rotor. One skilled in the art will readily recognize that an evaluation of brake pad instability and noise reduction, as well as other factors, must be taken into account in order to obtain the optimum angulation. Preliminary testing has revealed that the above-mentioned 2.5 degree angulation reduced the overall noise index (based on the percentage of unacceptably noisy stops) to a level significantly less than one-half of that encountered in conventional brake designs having perpendicularly-directed actuation forces. This noise reduction in the preliminary testing was especially significant in the 1,000 Hertz to 3,000 Hertz range, which tends to be the most problematic brake squeal noise range during low-speed brake applications.

Figure 3:
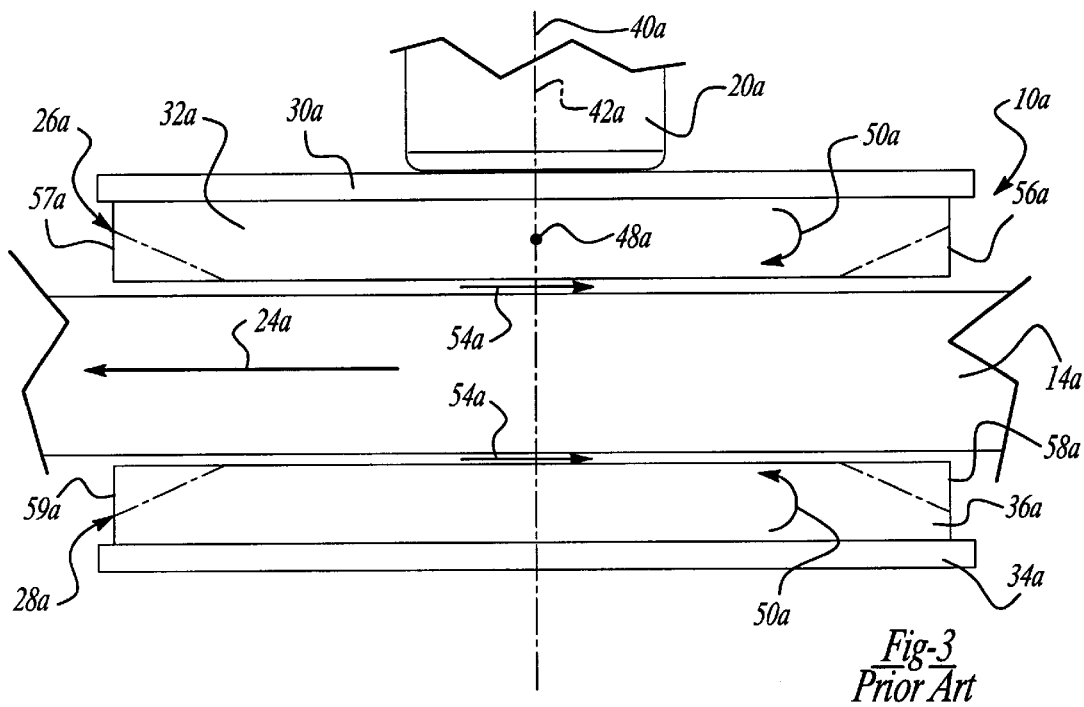
FIG. 3 is a schematic illustration of a conventional disc brake piston bore arrangement.

FIGS. 3 and 4 schematically illustrate the effects of the above-described angulation of the piston or other brake actuator centerline 40. As shown schematically in FIG. 3, in a conventional disc brake 10a, the application of the brakes by the operator causes the piston 20a and the reactive caliper (not shown in FIG. 3) to compressively squeeze the inboard and outboard pad assemblies 26a and 28a together on the rotating rotor 14a. This results in forces on the pads 32 and 36 in the direction of rotor rotation 24a, with reactive friction forces 54a being thus exerted on the rotor 14a in order to slow or ultimately halt the rotor's rotation. The pad backing plates 30a and 34a, respectively, react or oppose the force on the pads 32a and 36a, respectively, but at an offset location due to the overall thickness of the inboard and outboard pad assemblies 26 and 28. This produces resultant force couples 50a shown at the leading edges 56a and 58a of the pads 32 and 36, respectively, which tend to cause the pads to "pinch" the leading edges 56a and 58a together. This "pinching" effect causes the pads to compress against the rotor 14a to a greater extent at the leading edges 56a and 58a than at the trailing edges 57a and 59a, thus causing the pads to "bite in", "chatter" or "scuff" against the rotor, which in turn makes pad-to-disc instability and low speed braking noise in the form of high frequency squeal more likely to occur.

In contrast, as is schematically illustrated in FIG. 4, the disc brake assembly 10, according to the present invention, has its piston bore centerline 40 angulated at the above-described angle 44 with respect to a line 42 that is normal or perpendicular to the rotor 14, as discussed above. This results in the center of pressure 48 being moved toward the trailing edges 57 and 59 of the brake pads 32 and 36, respectively, and causes force couples 52 shown at the trailing edges 57 and 59 to counteract the force couples 50 shown at the leading edges 56 and 58, respectively. As a result the angulation 44 of the piston bore causes the pads 32 and 36 to exert a greater or at least equal compressive force on the rotor 14 at the pad trailing edges 57 and 59, respectively, when compared to the pad leading edges 56 and 58, respectively. This change in the compressive force leading and trailing magnitude relationship on the rotor 14, when compared to that illustrated in FIG. 3, has been found to greatly increase pad-to-disc stability and to significantly reduce brake noise or squeal, especially during low-speed brake applications when the vehicle is traveling in a forward direction.

Figure 5A:
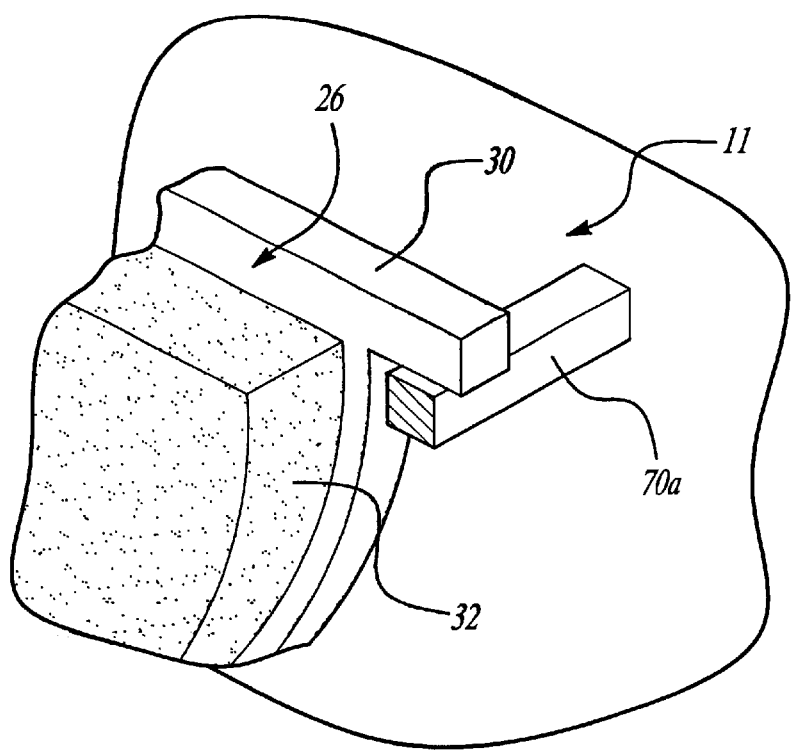
FIGS. 5A and 5B schematically illustrate the application of the braking torque loads from the brake's friction assemblies to its rails or pins, respectively.

FIG. 5A schematically illustrates the slidable relationship of the backing plate 30 on a rail 70a, such that the friction element 26 transfers brake torque loads directly to the rail 70a. One skilled in the art will readily recognize, of course, that the same slidable relationship and brake torque applying relationship exists with respect to the friction element 28 as well.

Figure 5B:
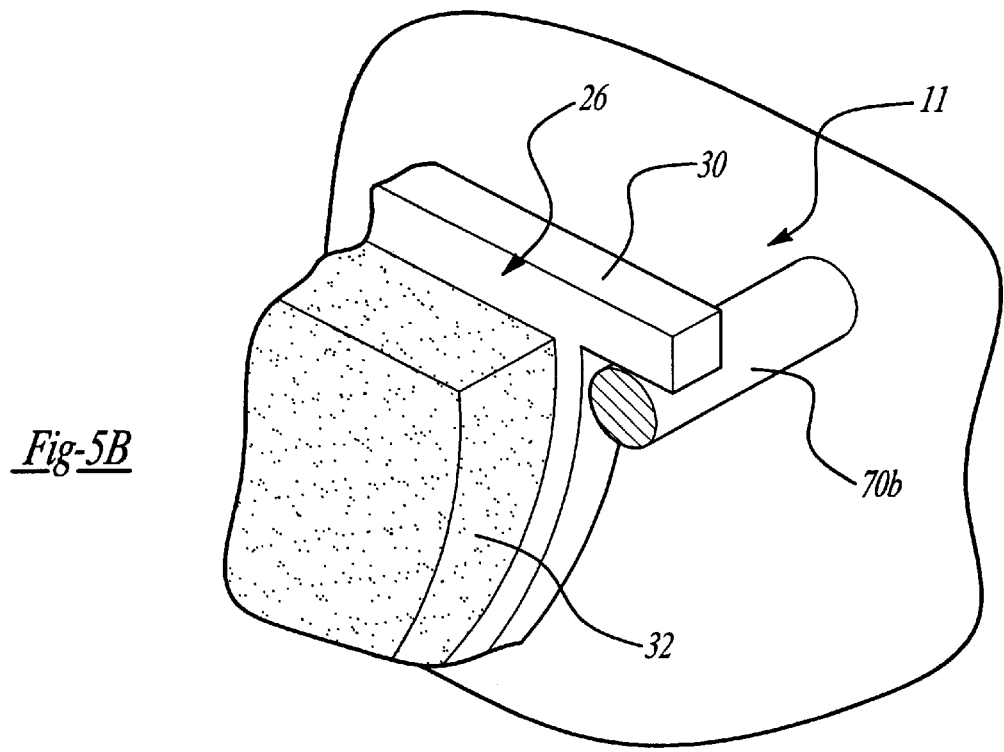

Similarly, FIG. 5B schematically illustrates the slidable relationship and brake torque applying relationship with the friction elements 26 and 28 with a cylindrical pin 70b. The rail 70a and the pin 70b, schematically illustrated in FIGS. 5A and 5B, are interconnected with the vehicle undercarriage, as is well-known to those skilled in the art.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A disc brake, including a rotor rotatable about an axis and having a friction surface on each of opposite axially outward-facing sides at locations radially outboard of the axis, a rotationally-fixed friction element disposed adjacent each of the rotor friction surfaces, the rotor being rotatable in a circumferential direction from a leading edge of the friction elements toward a trailing edge of the friction elements, and an actuating assembly selectively actuable to apply braking forces urging the friction elements in generally axially opposed inward directions frictionally engaging their respective adjacent rotor friction surfaces, said braking forces acting in brake-applying directions lying at an acute angle to a normal direction that is parallel to the rotor axis and perpendicular to the rotor friction surfaces, wherein said actuating assembly includes an actuator element on a first side of the rotor, said actuator element being selectively actuable for forcibly urging a first of the friction elements in a first of said brake applying directions into said frictional engagement with its adjacent rotor friction surface on said first side of the rotor, and a caliper element extending axially from said first side of the rotor to the second opposite side of the rotor, said caliper element being interconnected with said actuator element and generally axially movable with respect thereto for forcibly urging the other of the friction elements in a second of said brake applying directions into said frictional engagement with the other rotor friction surface in response to actuation of said actuator element.

2. The disc brake according to claim 1, wherein said braking forces are directed along brake-applying directions generally toward the rotor and toward the leading edge of the friction elements, said braking forces resulting in reactive forces causing the friction elements to exert a compressive force on the rotor at the trailing edge of the friction elements that is at least equal to the compressive force at the leading edge of the friction elements.

3. The disc brake according to claim 1, wherein said disc brake is a hydraulically-actuated disc brake, said actuator element being a hydraulic piston slidably movable within a hydraulic cylinder bore disposed in said caliper element on said first side of the rotor, said piston abuttingly engaging the friction clement on said first side of the rotor, and an opposite portion of said caliper clement on said second opposite side of the rotor abuttingly engaging the friction element on said second side of the rotor, said hydraulic cylinder bore having a centerline extending along said first brake-applying direction at said acute angle to said normal direction.

4. The disc brake according to claim 3, wherein said brake-applying directions are acutely angled generally circumferentially away from said normal direction.

5. The disc brake according to claim 3, wherein said brake-applying directions are acutely angled generally radially away from said normal direction.

6. The disc brake according to claim 3, wherein said brake-applying directions are acutely angled generally circumferentially and axially away from said normal direction.

7. The disc brake according to claim 3, wherein said piston and said opposite portion of said caliper exert said braking forces upon their respective adjacent friction elements that are directed along said brake-applying directions generally toward the rotor and toward the leading edge of the friction elements, said braking forces resulting in reactive forces on the friction elements causing the friction elements to exert a greater compressive force on the rotor at the trailing edge than at the leading edge of the friction elements.

8. The disc brake according to claim 7, wherein said brake-applying directions are at an angle of approximately 2½ degrees relative to said normal direction.

9. The disc brake according to claim 7, wherein said brake-applying directions are at an angle in the range of approximately ½ degree to approximately 5 degrees relative to said normal direction.

10. A disc brake according to claim 1, wherein at least one of said friction elements transfers braking torque loads to a rail member.

11. A disc brake according to claim 1, wherein at least one of said friction elements transfers braking torque loads to a pin member.

12. A hydraulically-actuated automotive disc brake, including a rotor rotatable about an axis and having a friction surface on each of opposite axially outward-facing sides at locations radially outboard of the axis, a caliper assembly with inboard and outboard leg portions disposed adjacent the outward-facing sides of the rotor, a hydraulic piston slidably movable within a hydraulic cylinder bore disposed in the inboard leg of the caliper on a first side of the rotor, said piston abuttingly engaging an inboard brake pad assembly disposed on said first side of the rotor, and the outboard leg of the caliper element on a second opposite side of the rotor abuttingly engaging an outboard pad assembly on said second side of the rotor, the rotor being rotatable in a circumferential direction from a leading edge of the pad assemblies toward a trailing edge of the pad assemblies, and said piston being selectively actuable to apply braking forces urging the pad assemblies in generally axially opposed inward directions frictionally engaging their respective adjacent sides of the rotor, said braking forces acting in brake-applying directions lying at an acute angle relative to a normal direction that is parallel to the rotor axis and perpendicular to the rotor friction surfaces, said braking forces being directed along brake-applying directions generally toward the rotor and toward the leading edge of the pad assemblies, said braking forces resulting in reactive forces causing the pad assemblies to exert a compressive force on the rotor at the trailing edge of the pad assemblies that is at least equal to the compressive force at the leading edge of the pad assemblies.

13. The automotive disc brake according to claim 12, wherein said braking forces result in reactive forces causing the pad assemblies to exert a compressive force on the rotor at the trailing edge of the pad assemblies that is greater than at the leading edge of the pad assemblies.

14. The automotive disc brake according to claim 12, wherein said brake-applying directions are acutely angled generally circumferentially away from said normal direction.

15. The automotive disc brake according to claim 12, wherein said brake-applying directions arc acutely angled generally radially away from said normal direction.

16. The automotive disc brake according to claim 12, wherein said brake-applying directions are acutely angled generally circumferentially and axially away from said normal direction.

17. The automotive disc brake according to claim 12, wherein said brake-applying directions are at an angle of approximately 2½ degrees relative to said normal direction.

18. The automotive disc brake according to claim 12, wherein said brake-applying directions are at an angle in the range of approximately ½ degree to approximately 5 degrees relative to said normal direction.

19. The automotive disc brake according to claim 12, wherein at least one of said friction elements includes a backing plate having a friction pad on one side.

20. The automotive disc brake according to claim 19, wherein said backing plate also includes an insulator member on its opposite side from said friction pad, said piston abuttingly engaging said insulator member, said abutment lying generally in a plane perpendicular to the direction of said piston actuating movement.

* * * * *